(12) United States Patent
Brockmoller

(10) Patent No.: US 9,992,922 B2
(45) Date of Patent: Jun. 12, 2018

(54) AGRICULTURAL CHIPPING MACHINE

(71) Applicant: KONGSKILDE INDUSTRIES A/S, Soroe (DK)

(72) Inventor: Fritz Brockmoller, Fallingbostel (DE)

(73) Assignee: CNH INDUSTRIAL DANMARK A/S, Hvidovre (DK)

( * ) Notice: Subject to any disclaimer, the term of this patent is extended or adjusted under 35 U.S.C. 154(b) by 0 days. days.

(21) Appl. No.: 15/312,228

(22) PCT Filed: Jun. 2, 2015

(86) PCT No.: PCT/EP2015/062239
§ 371 (c)(1),
(2) Date: Nov. 18, 2016

(87) PCT Pub. No.: WO2015/185541
PCT Pub. Date: Dec. 10, 2015

(65) Prior Publication Data
US 2017/0099766 A1    Apr. 13, 2017

(30) Foreign Application Priority Data

Jun. 3, 2014  (DE) .................... 20 2014 102 580 U

(51) Int. Cl.
*A01B 73/04* (2006.01)
*A01B 39/18* (2006.01)
*A01B 35/28* (2006.01)

(52) U.S. Cl.
CPC ............ *A01B 73/044* (2013.01); *A01B 35/28* (2013.01); *A01B 39/18* (2013.01)

(58) Field of Classification Search
CPC ........ A01B 83/044; A01B 35/25; A01B 39/18
See application file for complete search history.

(56) References Cited

U.S. PATENT DOCUMENTS

| 4,452,318 A | 6/1984 | Boetto |
| 2014/0060866 A1* | 3/2014 | Blunier .................. A01B 73/04 172/311 |

FOREIGN PATENT DOCUMENTS

| FR | 2 258 114 A1 | 8/1975 |
| WO | 92/01363 A1 | 2/1992 |

* cited by examiner

*Primary Examiner* — Tara Mayo-Pinnock
(74) *Attorney, Agent, or Firm* — Renner Kenner Greive Bobak Taylor & Weber

(57) ABSTRACT

The invention relates to an agricultural cultivator having a frame (10), which is designed to be self-propelled in a transport direction (T) or to be pulled by a tractor (5) in the transport direction (T), with a part of the frame (10) extending transversely to the transport direction (T) as a support (11), and with a plurality of individually mountable cultivator elements (20), which can be positioned side by side and spaced from one another on the support (11), wherein the support (11) is constructed from a plurality of support sections (12, 13, 14, 15) and has a folding mechanism (30) which enables the support sections (12, 13, 14, 15) to be folded onto one another about folding axes (31, 32, 33) that extend parallel to the transport direction (T). In addition, one or more mounting rails are provided. The mounting rails can be removably mounted on the support. The cultivator elements can be mounted on the mounting rail or rails.

4 Claims, 2 Drawing Sheets

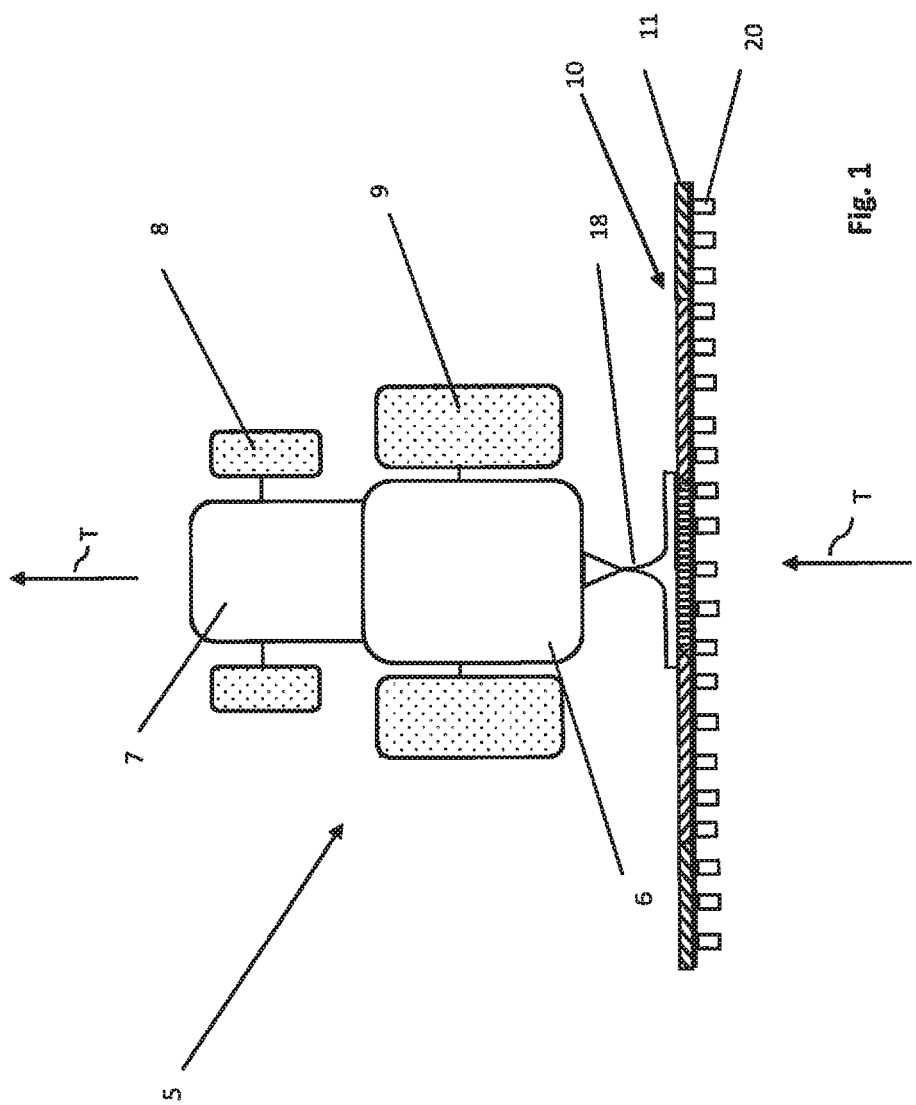

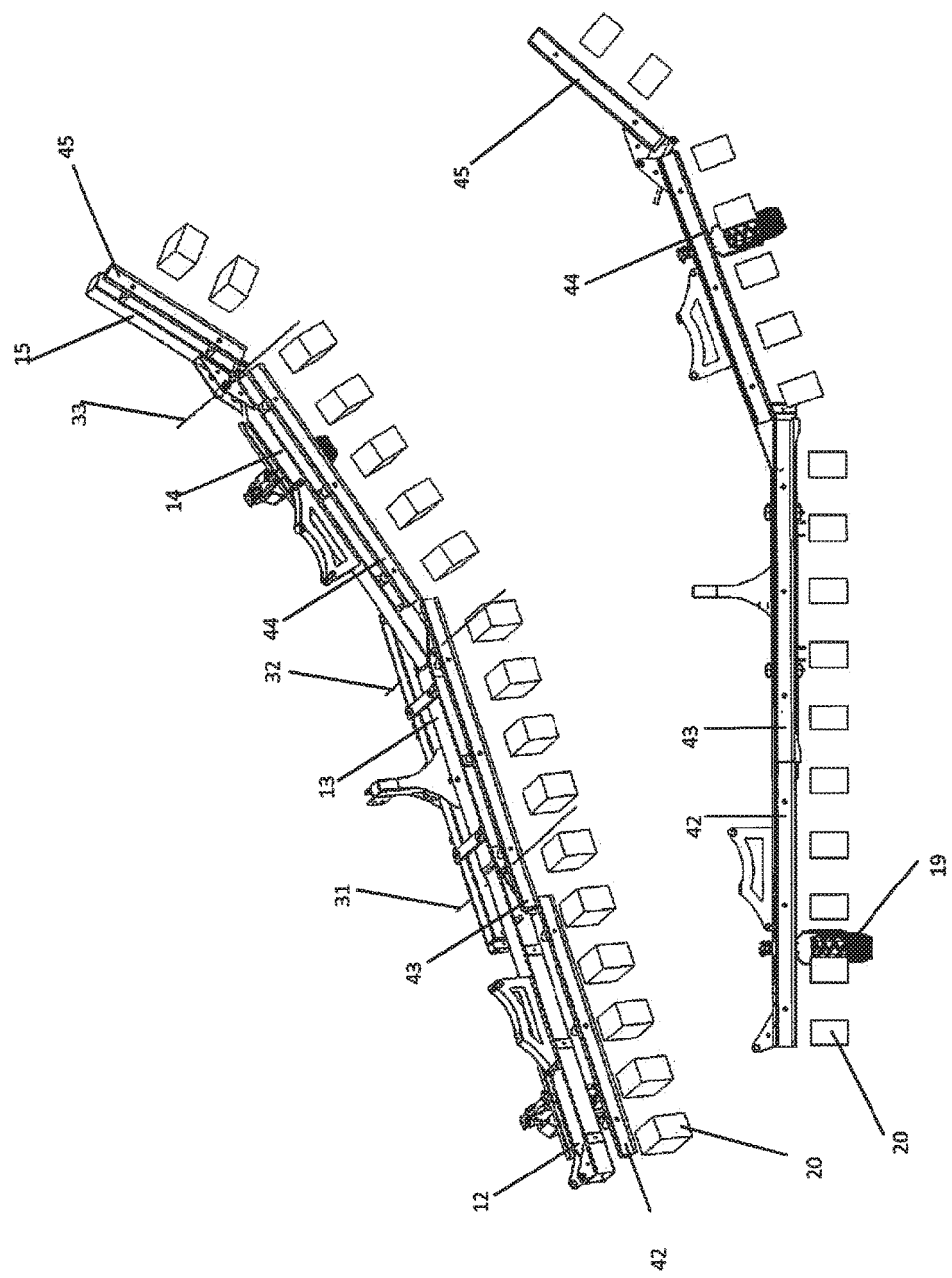

AGRICULTURAL CHIPPING MACHINE

FIELD OF THE INVENTION

The invention relates to an agricultural cultivator having a frame, which is designed to be self-propelled in a transport direction or to be pulled by means of a tractor in the transport direction, with a part of the frame extending transversely to the transport direction as a support, and with a plurality of individually mountable cultivator elements that can be positioned on the support side by side and spaced from one another, wherein the support is constructed from a plurality of support sections and has a folding mechanism that enables the support sections to be folded onto one another about folding axes that extend parallel to the transport direction.

BACKGROUND OF THE INVENTION

Agricultural cultivators are well known in the art. Cultivators are mobile agricultural implements. They are either self-propelled or, more frequently, designed as trailers to be attached to and pulled behind a tractor. They are equipped with cultivator blades that engage rotatingly in the soil. A multiplicity of these cultivator blades or cultivator elements or cultivator tools are attached to the agricultural cultivator side by side (as viewed perpendicular to the pulling direction).

DE 805 821 C1 addresses the aspect of making such a cultivator adjustable to various operating widths. In the fields to be worked, the rows, or furrows, that are to be worked with the cultivator elements also lie side by side at different distances from one another, depending on the type of crop being grown. The condition of the soil in the field to be worked may also make certain spacing recommended during cultivation, and it is of course necessary for the user, more particularly the farmer, to be able to use the cultivator for all of his fields, that is to say, for different distances between plant rows.

DE 42 34 432 A1 describes a method for controlling the relative positions of cultivator tools on an agricultural cultivator and a device for implementing the method. In said method, the cultivator tools and their positions are preset, and the correct setting is then readjusted in the field using detectable elements, which are placed there in advance and are spaced a predetermined distance from one another.

In the past several decades, a further practical aspect has been added as a requirement that must be considered in modern agricultural cultivators. During transport from the agricultural enterprise, for example a farmyard, to the field that will be cultivated, farm paths or country roads must be used. In either case, the overall width an agricultural cultivator may have is very limited. In some circumstances, field paths can be very narrow, and even on roads, certain widths may not be exceeded. It is therefore necessary for the agricultural cultivator to be collapsible or foldable, typically down to a width of about 3 m, for purposes of transport. In earlier times, this was not a problem, since cultivators as such were not particularly wide even in the field. However, over time this has changed considerably, and today, simply for economic reasons, it is important to be able to cultivate substantially larger areas simultaneously using the same implement, within a shorter time. It is therefore necessary for the agricultural cultivator to have a working width of 12 m, for example, in the field when cultivating work is being carried out, in order to allow a lane measuring 12 m in width and containing numerous rows or furrows lying side by side to be cultivated simultaneously, or to allow a field measuring 12 m in width or a section of field measuring 12 m in width to be cultivated completely in a single pass.

The agricultural cultivator can then be used to cultivate sugar beet, corn or potato fields, or fields with other crops that are planted in rows. This cultivation involves particularly removing weeds from these fields by the cultivating process.

In order for this to happen, the cultivator must be transported in its narrow transport width to the field, where it is then suitably enlarged to its working width. The multiplicity of cultivator elements must then be mounted on the cultivator in the field. In that case, these cultivator elements must all be attachable equidistant from one another, with the size of this distance then being dependent on the type of field. With this mounting, each of the cultivator elements is positioned in such a way that each cultivator element will run precisely on, or more specifically, precisely along the side of, a row of plants, where it will perform its work.

It is therefore necessary to be able to widen the cultivator suitably from its transport width to a working size. To address this problem, cultivators already exist which have a frame that permits a width of 12 m in the field, and which can be folded together to a width of 3 m for the transport route. Proposals for such folding mechanisms likewise exist.

These folding mechanisms naturally are necessarily accompanied by a need within the maximum width, for example 12 m, for points at which parts of the frame must be folded in some way, thereby forming and changing angles between frame sections.

As a result of this, the cultivator elements cannot be mounted until the cultivator is in the field and the frame has been unfolded, more specifically until all folding and unfolding movements have been carried out. And once the work of the agricultural cultivator in the field has been completed, but before the frame is folded back up, the cultivator elements must then be removed in order for the frame to be folded together and the agricultural cultivator to ultimately be returned along the transport route to the agricultural enterprise.

Farmers and other users find it less desirable to perform the task of mounting the elements in the field. Rainy weather conditions make it more difficult there. Furthermore, appropriate mounting tools must also be carried along to the field in order to perform the mounting task there. It is a further disadvantage that valuable working time during daylight hours is wasted performing the mounting task in the field.

As a compromise, farmers frequently attempt to mount at least some of the cultivator elements on the frame in advance, under the more favorable conditions existing at the agricultural enterprise. At the enterprise, appropriate barns or other buildings are typically available, in which abundant tools are available and in which this job of mounting can be easily performed, even under artificial light and/or poor weather conditions, in a dry environment and with adequate lighting.

Of course, before performing the mounting, the user must already know what type of field the agricultural cultivator will next be traveling to perform its work, and how far apart the individual rows of plants are there. Of course, this information is typically available to the agricultural enterprise. Even so, only a small number of cultivator elements can be mounted under these more favorable conditions, more specifically elements which, assuming the positioning on the frame has been calculated properly, are located on parts of the frame that will not impede unfolding during the subsequent folding process, or which do not lie too close to the folding points, if possible.

If the farmer limits himself to this mounting, a significant number of the necessary cultivator elements are not installed, resulting in decreased effectiveness of the agricultural cultivator during field work, since a number of plant rows will remain completely uncultivated.

And if this is to be avoided, there is no getting around the step of mounting the additional cultivator elements, which requires carrying the necessary tool along and working under unfavorable weather conditions.

It has even already been proposed to solve this problem by adjusting the spacing between plant rows to the spacing for later cultivation with agricultural cultivators. However, this highly contrived solution does not allow the plants to be planted at the economically most logical or effective distance from one another, with a potentially adverse effect on plant growth and crop yields. Thus with an approach of this type for addressing the technical problems of the cultivators being used, it may actually be possible to achieve a higher yield from the same field, planting the same crop.

This current situation is problematic.

BRIEF SUMMARY OF THE INVENTION

It is therefore the object of the invention to propose an agricultural cultivator which offers an improved method for mounting cultivator elements.

This object is achieved according to the invention with an agricultural cultivator of the aforementioned type in that one or more mounting rails are provided, in that the mounting rail(s) can be removably mounted on the support, and in that the cultivator elements can be mounted on the mounting rail(s).

This unexpected solution according to the invention completely and cleverly solves the problem.

The new solution is based on the concept of equipping the cultivator with one or more removable mounting rails on which the cultivator elements can be mounted.

According to the invention, these cultivator elements, cultivator tools or cultivator blades are no longer mounted directly on the cultivator or on the frame that spans the cultivator. In keeping with the conventional design, the frame retains the folding mechanism and the additional units that are relevant to its functioning and its ability to be drawn, that is to say the axle with the wheels, optionally a trailer hitch for attachment to a tractor, and any units that are required to ensure motorized unfolding.

Separately from this, a mounting unit is now provided, which consists of a continuous mounting rail or a plurality of mounting rails which may be assembled, and which then form a common mounting unit. This mounting unit can then be mounted as a complete unit or in the form of its individual mounting rails on the frame, wherein quick-mounting devices may be provided, to allow this to be performed particularly easily.

This mounting unit with its one or more mounting rails is designed to enable the cultivator elements to be mounted in advance spaced any desired distance from one another. Accordingly, some mounting rails have a length that does not end at the respective folding axes. This feature enables a cultivator element to be mounted on this mounting rail, whereas with a conventional support section this would not have been possible, since a cultivator element naturally cannot be mounted on a folding axis or in the immediate vicinity thereof. If a cultivator element were to be mounted on a folding axis, it would be completely uncertain how the cultivator element would move, or such movement would not even be possible, since otherwise the corresponding support section would interfere with the adjoining support section during the folding process, and thus could not support a cultivator element.

A selection of mounting rails of different longitudinal dimensions and having a suitable overall length depending on the intended spacing between the cultivator elements is then simply kept on hand.

The farmer or other user of the cultivator can thus perform the task of mounting the cultivator elements at a time that is convenient for him at his agricultural enterprise. There, he has any tool he might need at his disposal, and he can perform this work even in inclement weather and unfavorable visibility conditions inside a barn or other suitable workshop.

These preassembled mounting rails with the cultivator elements attached are then carried along during transport of the cultivator, either by means of a tractor, for example, or self-propelled. During this transport, the cultivator itself is folded together, as mentioned above, and thus has only a relatively narrow transport width.

The mounting unit can either be transported along on the device, because it has a similar width, or, in an embodiment having only one mounting rail, which then has a substantially greater length, this rail may be carried along in the longitudinal direction relative to the transport direction or may also be carried along separately.

Upon arrival in the field to be cultivated, the frame or the support sections is/are unfolded, thereby achieving the operating width. Using a small number of handles, the preassembled mounting rails or the mounting unit with all the cultivator elements can then be mounted in a single step on the frame or the support sections, and cultivation of the field can begin.

Once cultivation of the field is complete, the mounting rails with the cultivator elements attached thereto can be removed, allowing the support sections of the frame to be easily folded back together, and allowing the entire cultivator along with the mounting rails to then be transported back along the field path or along country roads to the agricultural enterprise.

Alternatively, another even more time-saving procedure is also possible using the technique of the invention. During preparation of the cultivator at the agricultural enterprise, it is already known how far the rows of plants will be spaced from one another in the field. It is then possible to search through, for example, a set of about a dozen mounting rails to find those that will not have any problems with collision or mutual impedance during the folding process even when preassembled on the frame. These mounting rails with the cultivator elements already attached can then also be fully preassembled in the agricultural enterprise under favorable working conditions. A nearly complete attachment is thus possible when the mounting rails are selected and prepared in such a way that their width also corresponds approximately to the width of the support sections, and their number is the same as the number of support sections. A set of mounting rails in which no cultivator elements are located at the transition pieces of the support sections are always carried along. The slightly different dimensions of certain mounting rails are then suitable precisely for achieving the proper overall dimensions.

Since in agricultural practice, only a certain, relatively small number of possible plant spacings of plant rows are used with traditional plants such as sugar beets, potatoes and corn, the number of possible rail configurations is also small.

For this reason, the number of mounting rails that must be kept on hand is likewise limited to a very small number.

A set of mounting rails of the correct size is thus used, and is then either mounted already in the agricultural enterprise or carried along into the field, where they can be easily mounted. Thus this procedure can be readily used even with foldable cultivators.

The problem is thus completely solved through a highly simple and cost-effective measure.

It is particularly preferable for an optical control device to be provided, which keeps the transport direction constantly parallel to a row of plants in a field. A measure of this type also allows the functionality of the agricultural cultivator to be further optimized.

Additional features of the invention are specified in greater detail in the dependent claims and in the following description of the figures.

BRIEF DESCRIPTION OF THE DRAWINGS

In the following, one embodiment example of the invention will be specified in greater detail in reference to the set of drawings. The drawings show:

FIG. 1 a plan view of a tractor with an embodiment of an agricultural cultivator according to the invention;

FIG. 2 a schematic, perspective representation of an enlarged section of an embodiment of an agricultural cultivator according to the invention;

FIG. 3 a view of the section of the agricultural cultivator of FIG. 2.

DETAILED DESCRIPTION OF THE INVENTION

FIG. 1 shows an agricultural tractor 5 in a plan view from the top. The agricultural tractor 5 moves in a transport direction T. It has an operator's cab 6, from which a farmer or other user controls the driving process, optionally along with special processes that can be performed by the additional units attached as trailers to the tractor 5. Extending forward from the operator's cab 6 in the direction of travel is an engine hood 7. The tractor 5 runs on wheels, specifically on two front wheels 8 and two rear wheels 9.

In one embodiment, the agricultural tractor 5 may also be operated by remote control, in other words without a driver in the operator's cab 6.

The tractor 5 pulls an agricultural cultivator which has a frame 10. The frame 10 is attached to the tractor 5 via a trailer mechanism 18. In an embodiment not shown, the cultivator may also be embodied as self-propelled.

On the frame 10, along with additional units that are not of interest here and thus are not shown, such as a motor for a folding mechanism, a support 11 is also provided. The support 11 may be designed as an integral part of the frame 10, but may also be designed as a separate element. On this support 11, cultivator elements 20 are positioned. These cultivator elements 20 are indicated only schematically. They are cultivator tools or cultivator blades for working the soil, more particularly for removing weeds or undesirable plants along rows of crops in a field to be worked.

The diagram shown in FIG. 1 is purely schematic. The tractor 5 is capable of pulling a cultivator with the frame 10 in a folded-down state along public roadways or along field paths. In that case, the cultivator along with the frame 10 is not significantly wider than the tractor 5 itself.

In a field to be worked, however, the working width of the cultivator along with the frame 10 is substantially wider than is shown in FIG. 1.

FIG. 2 shows a perspective, schematic representation of a section of the agricultural cultivator with the frame 10. Shown in particular is the support 11, which consists in this case of the four support sections 12, 13, 14 and 15. These can be folded by means of a folding mechanism 30 about three folding axes 31, 32 and 33. Each of these folding axes is located between two sequential support sections, in other words folding axis 31 between support sections 12 and 13, folding axis 32 between support sections 13 and 14, and folding axis 33 between support sections 14 and 15.

Of course, it is also possible for more or fewer support sections 12, 13, 14 and 15 to be provided, in which case more or fewer folding axes 31, 32 and 33 would be required.

In FIG. 2, the folding process is shown as partially completed and in process. In this case, the two support sections 12 and 13 have not yet been folded at all. Once the folding process has progressed further, all of support sections 12, 13, 14 and 15 will be folded up, so that the total width of the resulting configuration no longer substantially exceeds the width of one of these support sections.

Preferably, in fact, four support sections 12, 13, 14 and 15, each of approximately the same width, are provided, as shown.

As was already described in reference to FIG. 1, cultivator elements 20 are also provided in FIG. 2, once again indicated only schematically. These are positioned approximately equidistant from one another in front of the support having support sections 12, 13, 14 and 15. This corresponds to the likewise typically identical and constant distances between the rows of plants in a field, that is to say, side by side, spaced 55 cm from one another, for example. As is apparent, with a conventional mounting of these cultivator elements 20 directly onto the support or onto the support sections 12, 13, 14 and 15, some of the cultivator elements 20 would necessarily have to be mounted precisely or nearly precisely on the folding axes 31, 32 and 33, which would necessarily impede or in any case block folding.

According to the invention, therefore, a mounting unit 40 with mounting rails 42, 43, 44 and 45 is provided. This enables the cultivator elements 20 to be mounted on this mounting unit or on the mounting rails at the agricultural enterprise under workshop conditions. The mounting rails with the cultivator elements 20 mounted thereon may then be transported along with the tractor 5 and the agricultural cultivator with the frame 10, or, with the proper selection of the corresponding mounting rails 42, 43, 44 and 45, may be already mounted on the support sections 12, 13, 14 and 15, more specifically, by selecting mounting rails with longitudinal dimensions such that they can receive the cultivator elements 20 without producing problems at the intersecting points, and these rails can then be mounted suitably on the foldable support sections.

In any case, inconvenient measures required to mount a plurality of individual cultivator elements are no longer necessary.

FIG. 3 shows the configuration of FIG. 2, as viewed from the side or from the rear, of the agricultural cultivator behind the tractor 5. Shown once again are the cultivator elements 20 behind or below the mounting rails 42, 43, 44 and 45. Similarly to FIG. 2, a folding-up process is shown. It is also apparent that, although the dimensions of mounting rails 42, 43, 44 and 45 are approximately the same, they are not identical. It is likewise apparent that even where the cultivator elements 20 would coincide with folding axes 31, 32 and 33, the problems this would cause are avoided by the different dimensions of the mounting rails.

LIST OF REFERENCE NUMERALS

5 tractor
6 operator's cab
7 engine hood
8 front wheel
9 rear wheel
10 frame
11 support
12 support section
13 support section
14 support section
15 support section
18 trailer mechanism
19 wheel
20 cultivator element
30 folding mechanism
31 folding axis
32 folding axis
33 folding axis
40 mounting unit
42 mounting rail
43 mounting rail
44 mounting rail
45 mounting rail

The invention claimed is:

1. An agricultural cultivator having a frame,
which is designed to be self-propelled in a transport direction or to be pulled by a tractor in the transport direction,
with a part of the frame extending transversely to the transport direction as a support, and with a plurality of individually mountable cultivator elements, which can be positioned side by side and spaced from one another on the support,
wherein the support is constructed from a plurality of support sections and has a folding mechanism which enables the support sections to be folded onto one another about folding axes that extend parallel to the transport direction to achieve a folded-down state of less width than a working width of the cultivator,
characterized
in that one or more mounting rails are provided,
in that the mounting rails are removably mounted on the support, and
in that the cultivator elements are removably mounted on the mounting rail(s) such that said cultivator elements can be positioned and repositioned at desired intervals along said mounting rail(s), wherein the mounting rails are mountable and removable with the cultivator elements mounted thereon such that the mounting rails can be removed to permit the folding mechanism to fold the support sections onto one another without interference of the cultivator elements, and the mounting rails can be mounted on the support after the plurality of support sections are unfolded by the folding mechanism to a operating width.

2. The agricultural cultivator according to claim 1,
characterized
in that the number of mounting rails corresponds to the number of support sections on the frame, and
in that one mounting rail is removably mounted on each support section.

3. The agricultural cultivator according to claim 1,
characterized
in that the width of the support sections and the width of the mounting rails is between 2 meters and 4 meters.

4. The agricultural cultivator according to claim 1,
characterized
in that an optical control device is provided, which keeps the transport direction constantly parallel to a row of plants in a field.

\* \* \* \* \*